July 10, 1951

A. G. RICHARDSON 2,559,663

DIRECTION FINDING SYSTEM

Filed Dec. 1, 1949

INVENTOR
AVERY G. RICHARDSON
BY
ATTORNEY

Patented July 10, 1951

2,559,663

UNITED STATES PATENT OFFICE 2,559,663

DIRECTION FINDING SYSTEM

Avery Groat Richardson, Boonton, N. J., assignor to International Standard Electric Corporation, New York, N. Y., a corporation of Delaware Application December 1, 1949, Serial No. 130,513

13 Claims. (Cl. 343—114)

The present invention relates to a direction finding system in which the indicator is of the quasi-instantaneous stroboscopic type and more particularly wherein it is desired to have a uniform azimuth scale.

It is well known in radio direction finder systems to provide azimuth indication with an illuminated indicator of the stroboscopic type wherein the persistence of vision causes the indications to appear as a line of light indicating the direction. These indicators operate at rotational speeds in the order of 1800 R. P. M. When correction systems are considered for such indicators, it appears that various cam and roller arrangements are well-known for making scale corrections on manually operated direction finding systems in such a way that the correct bearing may be determined from an azimuth scale. Such arrangements as are well known to me, however, do not provide for any practical means whereby the cam and roller type of correction can be used to correct satisfactorily the azimuth indication of the line of light indicator.

It is understood that a line of light indicator may be provided with a non-uniform scale which is drawn from calibration data available to the operator, but such a non-uniform scale cannot be used with a gyro repeater compass.

An object of this invention is provision of an improved direction finding system using a stroboscopic type of indicator wherein the true bearings of received stations are indicated on a uniform scale.

Another phase of the invention considers means for providing calibration in a stroboscopic indicator so as to retain the uniform azimuth scale.

A further object is to provide a quasi-instantaneous indicator with a uniform scale capable of easy correction which may be operated in conjunction with a gyro repeater compass.

According to my invention I provide a stroboscopic indicator of the type wherein a pointer rotatable at the rate of the antenna rotation with respect to a scale is provided. A mask is provided which is fixed with respect to the scale. The mask is provided with one or more light passing channels shaped to care for quadrantal errors. The pointer comprises other light passing slots mounted to intersect the light passing channels at a given angle to the radius of the indicator disc.

Figure 1:
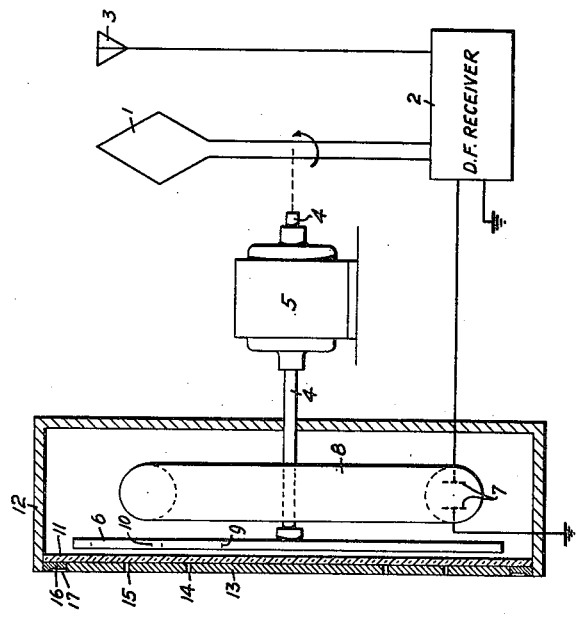
Figure 2:
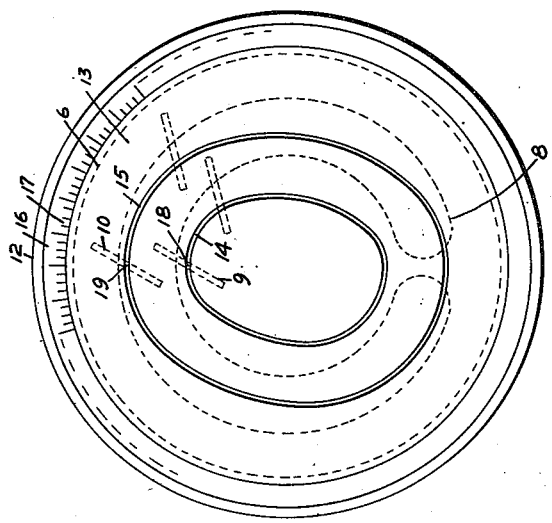

Other and further objects of the invention will become apparent from the following description of an embodiment thereof, reference being made to the accompanying drawings in which:

Figure 1 is a schematic diagram of a direction-finding system embodying my invention, of which certain mechanical parts are shown in section; and Figure 2 is a front view of some of the mechanical parts of Figure 1.

Referring now to Figure 1, a directional antenna system such as a loop 1 is connected to a radio receiver 2 of the type which gives a maximum output voltage at the instant of bearing indication. A sensing antenna 3 may also be connected to direction-finding receiver 2 as shown. The loop 1 is mounted so as to be rotated by the shaft 4 of a synchronous motor 5, a disc 6 being connected to one end of shaft 4 so that the disc rotates in synchronism with loop 1. The output of receiver 2 is connected to electrodes 7 of a circular neon tube 8 disposed at the rear of disc 6 and the circuit arrangements and design being such that the peak voltage developed at the instant of bearing indication is sufficient to flash neon tube 8 once for each rotation of loop 1. It is to be understood that these mentioned circuit arrangements may include such amplifying and voltage regulating means as will provide the proper voltage to excite the neon tube; and that any other suitable source of light may be used.

Disc 6 is preferably made of opaque material and is provided with at least one and preferably two narrow slits 9 and 10 inclined at an angle to the radius of the disc and located at different distances from the center thereof. Mounted in front of disc 6 is a mask 11 fixedly supported by a frame 12, mask 11 being composed of transparent material such as glass and having its front face covered with an opaque coating composed for example of black varnish, the thickness of the coating being exaggerated in Figure 1 for the purpose of clarity. The coating is engraved to provide at least one and preferably two narrow channels 14 and 15 which pass light. Each channel forms a continuous correction curve and its shape as a departure from a circle is determined by the quadrantal errors observed at the time of calibration of the direction finder. It will be clear that a single slit and corresponding light passing channel would give a corrected direction indicating spot. The reading is difficult however as it would have to be considered with respect to the radial line. By using the two slits and channels improved reading is facilitated. According to one method of making these channels, they are arranged to be at a uniform separation distance, that is to say, if they are formed similarly to a known method of making compensating cam tracks. In such a case the engraving pens or brushes will be mounted fixedly on a common carrier which is moved under suitable control. This construction process not being a part of this invention is not further described. The principle of the invention however is not necessarily limited to this equi-distant separation. An annular scale 16 is provided whose face is marked with graduations 17 which extend for a full 360 degrees, only a portion of them being shown in Figure 2.

At the instant the neon tube 8 is lighted, the narrow bands of light passing through the slits 9 and 10 form two small spots 18, 19 where they intersect the correction curves 14, 15. The two spots 18, 19 when lighted form a radial pointer directed towards scale 16 and the correct bearing of the station may be read off directly on the graduations 17. At the position of disk 6 where the slits 9 and 10 are shown dotted, the light spots 18, 19 appear on a full radius of the correction curves 14 and 15, a position where no correction for quadrantal error is required. In various other positions, such as the other one shown, where the slits 9 and 10 appear in full lines, the light spots 18 and 19 appear on a line which is not a full radius of the correction curves and in an indicating position which provides the required correction for quadrantal error. In every case the true bearing is easily and directly read off on scale 16.

While the invention has been described in connection with specific apparatus, this is done by way of example and not as a limitation on the scope of my invention as set forth in the objects aforementioned and in the following claims.

I claim:

1. In a direction finder comprising a directional antenna system, a direction-finding receiver, means coupling said antenna system to said receiver, means for shifting the directional pattern of said antenna system at a given frequency, an indicator comprising an illuminatable pointer, means for illuminating said indicator in response to a predetermined energy level of said receiver, and an error compensating arrangement, said indicator and said compensating arrangement being disposed adjacent said illuminating means, and means for providing relative movement between said compensating arrangement and said indicator in synchronism with said pattern shifting means.

2. A direction finder according to claim 1, wherein said indicator constituting the pointer comprises an opaque disk having spaced light-passing slits therein mounted for rotation with the direction pattern shifting means, and said error compensating arrangement includes a correction pattern comprising a light-masking member having light transmitting paths arranged about the axis of said rotation, said disc and said light-masking member being disposed adjacent each other so that one overlies the other with respect to said illuminating means.

3. A direction finder according to claim 2, wherein said slits are each inclined to the radius about the axis of said rotation, there being one for each correction pattern transmission path.

4. A direction finder according to claim 2, wherein the correction pattern comprises two light paths maintained at a uniform distance of separation and shaped to conform to correction for quadrantal error.

5. In a direction finder comprising a directive antenna system, a direction finder receiver, means coupling said antenna system to said receiver, means for varying the directivity of said antenna system, an indicator comprising, a relatively fixed disc having a light passing channel, said channel being positionally oriented on said disc in accordance with the quadrantal error associated with said direction finder, a second disc having a light passing channel, a normally unenergized source of light behind said discs, means for energizing said source of light in response to said receiver output, means for providing a rotative movement of said second disc in synchronism with said varying means whereby the light from said source is directionally modified by the relative positioning of the channel of said second disc and said light source, and calibrated scale means associated with said first disc.

6. A direction finder according to claim 5 wherein the relative movement between said discs is about a given axis and the light passing channel of said first disc comprises a channel of light varying in position radially with respect to said axis in accordance with said quadrantal error.

7. A direction finder according to claim 6, wherein the light passing channel of said record disc comprises one or more slits of light each of which has a linear axis disposed at an angle with respect to a radial line emanating from the axis of said discs.

8. In a direction finder comprising a directional antenna system, a direction finding receiver, means coupling said antenna system to said receiver, means for shifting the directional pattern of said antenna system at a given frequency, illuminating means, means responsive to the energy at the output of said receiver and adapted at a peak energy level to flash said illuminating means, and indicating means mounted adjacent said illuminating means for passing two spaced-apart spots of light, said indicating means comprising a rotatable member mounted for rotation in synchronism with said directional pattern shifting means, a graduated scale, and a masking member fixedly mounted with respect to said rotatable member and having two light-transmitting paths shaped to compensate for quadrantal error whereby the true bearing is indicated on the graduations of the scale by said light spots.

9. In a direction finder comprising a directional antenna system, a direction-finding receiver, means coupling said antenna system to said receiver, means for shifting the directional pattern of said antenna system at a given frequency, illuminating means, means responsive to the energy at the output of said receiver and adapted at a peak energy level to flash said illuminating means, a movable member mounted for rotation about an axis and disposed adjacent said illuminating means, said movable member having at least one narrow light-transmitting portion, means for rotating said movable member in synchronism with the directional pattern shifting means, a masking member mounted adjacent said movable member, fixedly mounted with respect to said movable member and constructed to intercept the light passed through the light-transmitting portion of said movable member except a small spot thereof, and a graduated scale adapted to indicate the position of said light spot.

10. A direction finding system according to claim 9, in which said movable member is opaque and the light-transmitting portion thereof comprises a slit inclined to a line passing through the axis of rotation of the movable member.

11. In a direction finder comprising a directional antenna system, a direction-finding receiver, means coupling said antenna system to said receiver, means for shifting the directional pattern of said antenna system at a given frequency, illuminating means, means responsive to peak value levels of the energy at the output of said receiver for flashing said illuminating means, a disc mounted for rotation and disposed adjacent said illuminating means, said disc having two narrow light-transmitting portions at different radial distances, means for rotating said disc in synchronism with the directional pattern shifting means, a masking member mounted adjacent said disc and constructed to intercept the light passed through the light transmitting portions of said disc except two small spots thereof, and a graduated scale, the said two light spots serving to indicate the true bearing on the graduations of said scale.

12. A direction finder according to claim 11, in which said disc is opaque and the light-transmitting portions thereof comprise two slits.

13. A direction finder according to claim 11, in which said disc is opaque and the light-transmitting portions thereof comprise two slits both inclined to a radius passing through the slits.

AVERY GROAT RICHARDSON.

No references cited.